United States Patent [19]
Christy

[11] 4,073,552
[45] Feb. 14, 1978

[54] BEARING RETAINER

[75] Inventor: Ronald I. Christy, Malibu, Calif.

[73] Assignee: Hughes Aircraft Company, Culver City, Calif.

[21] Appl. No.: 561,403

[22] Filed: Mar. 24, 1975

Related U.S. Application Data

[63] Continuation of Ser. No. 380,031, July 17, 1973, abandoned, which is a continuation of Ser. No. 259,891, June 5, 1972, abandoned.

[51] Int. Cl.² .............................................. F16C 33/46
[52] U.S. Cl. ............................ 308/201; 308/DIG. 8; 428/304
[58] Field of Search ................. 302/201, 240, 78, 188, 302/217, 216, DIG. 4, DIG. 8, DIG. 9; 161/159

[56] References Cited
U.S. PATENT DOCUMENTS

| 3,118,163 | 1/1964 | Abberly | 161/159 |
|---|---|---|---|
| 3,162,493 | 12/1964 | Hanau | 308/201 |
| 3,220,786 | 11/1965 | McCutchen | 308/240 |
| 3,529,875 | 9/1970 | McKee | 308/201 |
| 3,582,164 | 6/1971 | Derner et al. | 308/201 |

*Primary Examiner*—Richard A. Bertsch
*Attorney, Agent, or Firm*—Noel B. Hammond; W. H. MacAllister

[57] ABSTRACT

A ball-bearing retainer in which rigid members support a soft, flexible, highly porous annular body having ball pockets for receiving bearing balls. The annular body is made of a porous foamlike material capable of absorbing between 40 and 80% by volume of a liquid lubricant such as oil, and being capable of supplying 60 to 80% of the stored lubricant to the bearing. Because of its flexibility, the annular body may be of one-piece construction with spherical ball pockets, and may be closely fitted to the bearing races and balls.

26 Claims, 2 Drawing Figures

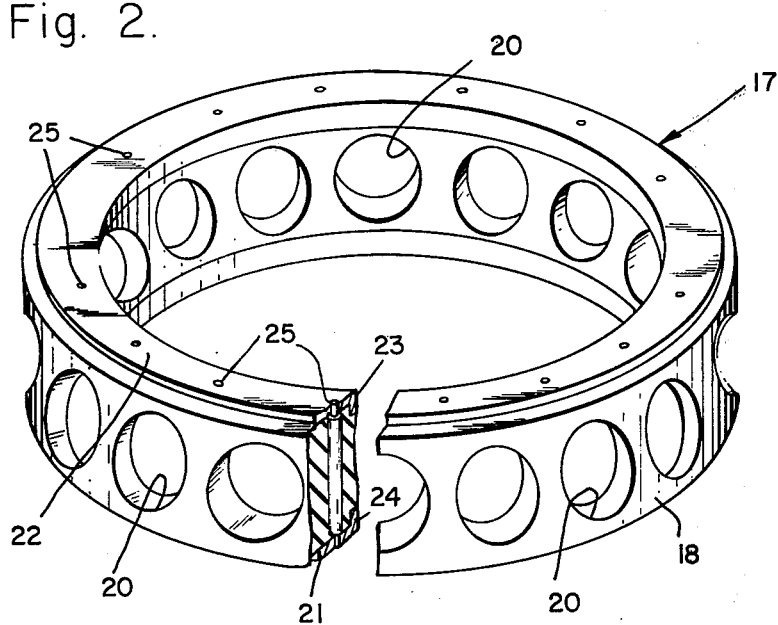
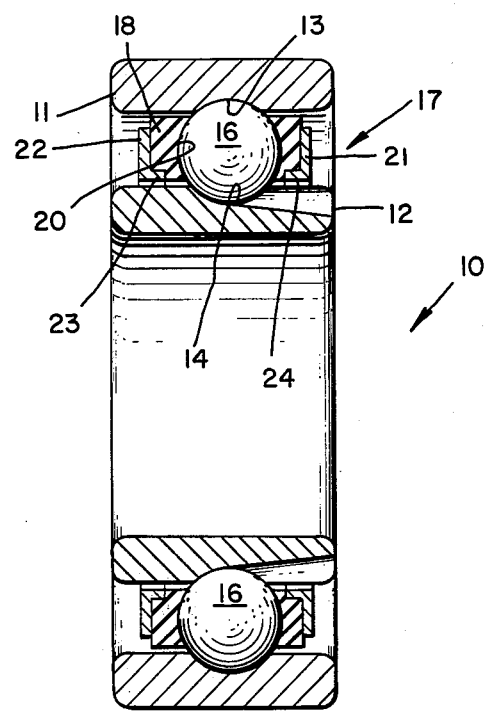

BEARING RETAINER

This is a continuation of prior copending application Ser. No. 380,031, filed July 17, 1973, now abandoned, which was in turn a continuation of application Ser. No. 259,891, filed June 5, 1972, now abandoned.

FIELD OF THE INVENTION

This invention relates to bearing retainers, cages or separators, and more specifically, to improved lubricating ball-bearing retainers employing a soft, flexible oil-impregnated material.

DESCRIPTION OF THE PRIOR ART

Heretofore, lubricating ball-bearing retainers have employed a porous, oil-impregnated cotton or paper phenolic laminate material, or the like. Such prior art bearing retainers are shown in U.S. Pat. No. 3,627,607, issued Dec. 14, 1971, for Method of Manufacturing a Bearing Cage, and U.S. Pat. No. 3,529,875, issued Sept. 22, 1970, for Reinforced Lubricating Ball Bearing Cage.

These prior art ball-bearing retainers exhibit a number of disadvantageouss properties. The phenolic laminate material contains contaminants which cause non-wetting of the surfaces of the ball bearings and the bearing races, and non-wetting leads to loss of lubricant and high wear. The rigidity and coefficient of restitution of phenolic laminate do not prevent torque noise. That is, phenolic laminate does not have sufficient compliance and vibration-absorbing qualities to prevent torque noise, and the use of retainers made of phenolic laminate leads to retainer instability. The low porosity of only 2 to 10% in the phenolic laminate does not provide sufficient oil storage or safety margin for many critical applications. Also, the high wear rate of phenolic laminate due to its being a hard material leads to early failure of bearings in which it is employed.

More absorbent, sponge-like materials such as felt, or the like, have been found to be unsuitable for use in bearings. The oil transfer characteristics of oil-impregnated materials such as felt are not suitable for critical applications. The material results in contamination due to wear particles in the oil and a smeared film on the bearing surfaces that cause non-wetting. Abrasion resistance is so poor with materials such as felt that a bearing running continuously against the material tears it to bits. The debris from felt-like materials can cause bearing failure by jamming. Thus, bearings made employing conventional sponge-like materials are also subject to early failure.

Accordingly, it is an object of the present invention to provide a lubricating ball-bearing retainer having a long useful life in critical applications where long duration unattended operation is required.

Another object of the invention is the provision of a ball-bearing retainer having a low, constant torque noise and a minimum of instability.

Yet another object of the invention is to provide a ball-bearing retainer having a low wear characteristic.

A further object of the present invention is the provision of a bearing retainer having a high oil storage capacity which will not become exhausted in a short time and which is capable of supplying most of the stored oil to the bearing.

An even further object of the invention is to provide a bearing retainer which is highly abrasion resistant and which will not contaminate the lubricant or the bearing metal surfaces.

SUMMARY OF THE INVENTION

In accordance with these and other objects of the invention, there is provided an annular body made of a soft, flexible highly porous, oil-impregnated material reinforced by rigid members which may be annular plates made of a rigid material such as metal. The annular body is provided with ball pockets for receiving bearing balls. The material of which the annular body is made is an amorphous open pore, microporous foamlike material which is highly abrasion resistant, and which has a Shore A hardness of between 20 and 60. The soft, flexible material reduces retainer instability and torque noise because of its compliance and vibration-absorbing qualities. The material stores a large (between 40 and 80% by volume) quantity of lubricant for extended bearing life, and 60 to 80% of the stored lubricant is accessible to the bearing. The flexible material is inherently extremely clean and does not cause contamination of the lubricant or bearing metal surfaces. The balls and races contact only the flexible, oil-impregnated material, which produces little wear and leads to long bearing life. Because of the flexibility of the material, the annular body may be of one-piece construction with spherical ball pockets, and may be closely fitted to the bearing races and balls.

BRIEF DESCRIPTION OF THE DRAWINGS

The foregoing and other objects and features of the present invention may be more readily understood with reference to the following detailed description taken in conjunction with the accompanying drawings, wherein like reference numerals designate like structural elements, and in which:

FIG. 1 is a sectional view of a ball bearing employing a bearing retainer in accordance with the present invention; and FIG. 2 is a perspective view partially broken away of a ball bearing retainer construction according to the present invention.

DESCRIPTION OF THE EXEMPLARY EMBODIMENTS

Referring to the drawings, FIG. 1 shows a ball bearing 10 which is of a conventional type except for the retainer thereof, as described in greater detail hereinbelow. While the ball bearing 10 here chosen to illustrate the invention is of the deep groove, single row, angular contact type, the retainer construction of the invention is not limited to such a bearing construction and it can be used on radial-type, double row type, thrust type and other types of bearing construction wherein the use of a retainer may be desired. In various other respects also, such as details of bearing construction, materials referred to and dimensional relationships, the following described bearings are set forth solely for illustrating the invention and are not to be taken as limiting.

The ball bearing 10 comprises an outer bearing race 11 and an inner bearing race 12 which are concentric and radially spaced from each other. The bearing races 11 and 12 have radially aligned opposed raceways 13 and 14. An annular row of bearing balls 16 is disposed between the bearing races 11 and 12 and the balls 16 are received in the raceways 13 and 14 in conventional fashion.

The bearing 10 is provided with the improved lubricating retainer in accordance with the present invention indicated generally by the reference character 17. The retainer 17 comprises an annular body 18 made of a porous foamlike material impregnated with lubricating oil and having spherical ball pockets 20 therein for receiving the balls 16. Annular reinforcing plates 21 and 22 of relatively rigid material such as metal are secured to the sides of the annular body 18.

The annular body 18 is made of an open pore microporous material. By microporous is meant that the pores have a diameter on the order of ten microns. This material should be capable of absorbing between 40 and 80% by volume of a liquid lubricant such as oil and should be capable of supplying 60 to 80% of the stored lubricant to the bearing. The material is an amorphous foamlike material which is highly abrasion resistant and which is extremely soft and flexible. It should have a Shore A hardness of between 20 and 60. One foamlike material which has been found to be particularly well suited to the manufacture of the annular body 18 is nitrile acrylic copolymer foam called "High Speed Micro-Well" sold by Elasto-Labs of Brooklyn, New York. However, any other flexible porous foamlike material having the properties set forth above may be used if desired.

Structural rigidity is provided by the annular reinforcing plates 21 and 22 secured to the sides of the annular body 18. These plates 21 and 22 may be made of any material which is relatively rigid as compared with the foamlike material of which the annular body 18 is made. They may, for example, be made of glass fiber or fabric reinforced epoxy resin or of a metal or any other suitable material. Moreover, any suitable binder such as phenolic resin adhesive or an epoxy or the like may be used to bond the plates 21 and 22 to the outer sides of the annular body 18.

The plates 21 and 22 have an inner diameter slightly larger than the outer diameter of the inner race 12 so that they will not be in contact. The outer diameter of the plates 21 and 22 is less than the outer diameter of the annular body 18 so that only the soft, flexible annular body 18 can contact the outer race 11. The plates 21 and 22 are provided with lips 23 and 24 extending inward to engage corresponding annular grooves in the annular body 18. The lips 23 and 24 maintain the annular body 18 concentric with the plates 21 and 22.

Because the annular body 18 is made of a highly flexible material, the ball pockets 20 may be of a spherical shape although the annular body 18 is of one piece construction. In more rigid materials the annular body 18 would have to be made in two parts in order to permit the balls 16 to be placed in the ball pockets 20. However, in the retainer 17 of the present invention, the balls 16 may be snapped into the ball pockets 20 because of the resilience of the material of which the annular body 18 is made. Furthermore, as shown in FIG. 1 the annular body 18 may be dimensioned such as to fit closely to the bearing balls 16 and to the inner and outer races 11 and 12. The annular body 18 is not tightly fitted to the races 11 and 12. The clearance may be reduced compared to the clearance in conventional bearings by 50 to 75%. When the annular body 18 is made of more conventional rigid material, such close fitting is not possible. By fitting the annular body 18 close to the balls and races, retainer instability and torque noise is decreased. A close fitting annular body 18 increases the bearing torque somewhat, but in some applications this may be preferable to increased torque noise and instability.

FIG. 2 shows a modification of the bearing retainer 17 of FIG. 1. This retainer 17 is a race riding retainer having cylindrical ball pockets 20 instead of spherical. This retainer 17 is not made to fit closely to the bearing balls or to the races. The annular plates 21 and 22 are interconnected to form a rigid structure by means of rivets 25, or the like, which pass between the ball pockets 20. Thus, although the material of which the annular body 18 is made is soft and flexible, the annular plates 21 and 22 rigidly connected by the rivets 25 support the annular body 18 mechanically.

By varying the size and shape of the ball pockets 20, ball riding rather than race riding retainers may be constructed in accordance with the present invention. The configuration of the ball pockets 20 may be varied as desired and may be provided with a lip at one edge to aid in assembly by preventing the balls from falling out. If desired, the annular body 18 may be made in two halves which then are clamped together in the rigid structure formed by the annular plates 21 and 22 interconnected by rivets 25.

The annular body 18 may be fabricated by first impregnating the foamlike material with a substance such as water soluble resin, or the like, which makes it relatively rigid. The material can then be machined, even including the machining of spherical ball pockets. After machining, the rigidizing substance is washed from the material of which the annular body 18 is made and it is impregnated with a lubricant. The balls may then be inserted into the ball pockets 20, and the retainer 17 assembled with the inner and outer races.

In operation, the lubricant impregnated in the foamlike material flows to the surface of the annular body 18 where it is metered onto the balls and races by the surface pores. Because of the porous nature of the material of which the annular body 18 is made, it is capable of supplying 60 to 80% of the stored lubricant to the bearing. The lubricant travels to the surface of the annular body 18 by means of capillary action. Because the pores are very small, being on the order of ten microns in diameter, the oil is very gradually metered on to the surface of the balls. The retainer 17 will not provide excess oil to the bearings and, in fact, will re-absorb excess oil present on the balls.

The ball bearing retainer of the present invention may be used in critical applications where there are requirements for long term (five to ten years or more) unattended operation at low and very steady bearing friction torque. The soft flexible material causes little retainer instability or torque noise and is highly resistant to abrasion. Various retainer configurations are possible using different frame designs and different ball pocket shapes. Both ball guided and race guided retainer designs are possible. Nonwetting of balls and races due to retainer contaminants is eliminated. The flexible material is inherently extremely clean and does not cause contamination of the lubricant or bearing metal surfaces.

It is to be understood that the above-described embodiments are merely illustrative of but a small number of the many possible specific embodiments which can represent applications of the principles of the present invention. Numerous and varied other arrangements can be readily devised in accordance with these principles by those skilled in the art without departing from the spirit and scope of the invention.

What is claimed is:

1. A ball bearing retainer including in combination, an inner annular body of open pore microporous flexible foamlike material, having sides generally perpendicular to the central axis of the annulus formed by the body and respective annular reinforcing plates of relatively rigid material secured to said sides, said foamlike material comprising an open pore microporous nitrile acrylic copolymer foam having a Shore A hardness of between 20 and 60.

2. A ball bearing retainer as in claim 1 in which said foamlike material holds between about forty percent and about eighty percent by volume of a lubricant.

3. A ball bearing retainer as in claim 1 in which between about sixty percent and about eighty percent of lubricant stored in said foamlike material is retrievable.

4. A ball bearing retainer as in claim 1 in which said inner annular body is of one piece construction and has spherical ball pockets.

5. A ball bearing retainer as in claim 1 in which said inner annular body is closely fitted to the surfaces of inner and outer bearing races and bearing balls.

6. A ball bearing retainer comprising:
an annular body of amorphous flexible foamlike material having open pores on the order of ten microns in diameter for storing a large amount of lubricant without contamination thereof, and having a wear rate low enough to avoid deterioration of bearing performance due to debris, said foamlike material comprising an open pore microporous nitrile acrylic copolymer foam having a Shore A hardness of between 20 and 60.

7. A ball bearing retainer as in claim 6 in which said foamlike material holds between about forty percent and about eighty percent by volume of a lubricant.

8. A ball bearing retainer as in claim 6 in which between about sixty percent and about eighty percent of lubricant stored in said foamlike material is retrievable.

9. A ball bearing retainer as in claim 6 in which said annular body is of one piece construction and has spherical ball pockets.

10. A ball bearing retainer as in claim 6 in which said annular body is of one piece construction and has cylindrical ball pockets.

11. An improvement in a ball bearing retainer for use in a bearing of the type having a metal inner race, a metal outer race, metal balls therebetween to form load-bearing metal-to-metal interfaces, and an annular bearing ball retainer having openings for receiving and separating said balls, wherein the improvement comprises: said retainer being made of a foamlike material having microscopic open pores on all surfaces thereof, said foamlike material serving as a long term oil supply means for providing oil indirectly to said metal-to-metal interfaces via said balls, and for absorbing excess oil on said balls, said foamlike material being free from bearing a load and being free from compression forces, said foamlike material being combined with a stiff rigidizing material for maintaining the dimensional integrity of said retainer, said foamlike material comprising an open pore microporous nitrile acrylic copolymer foam having a Shore A hardness of between 20 and 60.

12. A ball bearing retainer as in claim 11 in which said foamlike material holds between about forty percent and about eighty percent by volume of a lubricant.

13. A ball bearing retainer as in claim 11 in which between about sixty percent and about eighty percent of lubricant stored in said foamlike material is retrievable.

14. A ball bearing retainer as in claim 11 in which said retainer is of one piece construction and has spherical ball pockets.

15. A ball bearing retainer as in claim 11 in which said retainer is closely fitted to the surfaces of inner and outer bearing races and bearing balls.

16. A ball bearing retainer comprising:
an inner annular body having sides generally perpendicular to the central axis of the annulus formed by the body; and
respective annular reinforcing plates of relatively rigid material secured to said sides;
said inner annular body being made of an open pore foamlike microporous material which holds between about 40 percent and about 80 percent by volume of a lubricant, and from which between about 60 percent and about 80 percent of lubricant stored therein is retrievable, said material having a Shore A hardness of between 20 and 60, said pores having a diameter on the order of ten microns.

17. A ball bearing retainer comprising:
an annular body; and
rigidizing means made of a stiff material and combined with said body for maintaining the dimensional integrity thereof;
said annular body being made of an open pore foamlike microporous material which holds between about 40 percent and about 80 percent by volume of a lubricant, and from which between about 60 percent and about 80 percent of lubricant stored therein is retrievable, said material having a Shore A hardness of between 20 and 60, said pores having a diameter on the order of ten microns.

18. A ball bearing retainer comprising:
an annular body for storing lubricant; and
rigidizing means combined with said body for maintaining the dimensional integrity thereof;
said annular body being made of an open pore foamlike microporous material which holds between about 40 percent and about 80 percent by volume of a lubricant, and from which between about 60 percent and about 80 percent of lubricant stored therein is retrievable, said material having a Shore A hardness of between 20 and 60, said pores having a diameter on the order of 10 microns.

19. A ball bearing retainer comprising:
an annular body for storing lubricant; and
reinforcing members combined with said body for maintaining the dimensional integrity thereof;
said annular body being made of an open pore foamlike microporous material which holds between about 40 percent and about 80 percent by volume of a lubricant, and from which between about 60 percent and about 80 percent of lubricant stored therein is retrievable, said material having a Shore A hardness of between 20 and 60, said pores having a diameter on the order of 10 microns.

20. A ball bearing retainer comprising:
an annular body for storing lubricant; and
relatively rigid reinforcing members combined with said body for maintaining the dimensional integrity thereof;
said annular body being made of an open pore foamlike microporous material which holds between about 40 percent and about 80 percent by volume of a lubricant, and from which between about 60 percent and about 80 percent of lubricant stored therein is retrievable, said material having a Shore A hardness of between 20 and 60, said pores having a diameter on the order of ten microns.

21. A ball bearing retainer comprising:

an annular body for storing a large amount of lubricant without contamination thereof, and having a wear rate low enough to avoid deterioration of bearing performance due to debris;

said annular body being made of an open pore foamlike microporous material which holds between about 40 percent and about 80 percent by volume of a lubricant, and from which between about 60 percent and about 80 percent of lubricant stored therein is retrievable, said material having a Shore A hardness of between 20 and 60, said pores having a diameter on the order of 10 microns.

22. A ball bearing comprising:

a metal inner race;

a metal outer race;

metal balls therebetween to form load-bearing metal-to-metal interfaces; and an annular bearing ball retainer having openings for receiving and separating said balls;

said annular bearing ball retainer being made of an open pore foamlike microporous material which holds between about 40 percent and about 80 percent by volume of a lubricant, and from which between about 60 percent and about 80 percent of lubricant stored therein is retrievable, said material having a Shore A hardness of between 20 and 60, said pores having a diameter on the order of 10 microns;

said foamlike material serving as a long term oil supply means for providing oil indirectly to said metal-to-metal interfaces via said balls, and for absorbing excess oil on said balls, said foamlike material being free from bearing a load and being free from compression forces; said foamlike material being combined with a stiff rigidizing material for maintaining the dimensional integrity of said retainer.

23. A ball bearing retainer comprising:

an annular body of open pore microporous foamlike material, and rigidizing means made of a stiff material and combined with said body for maintaining the dimensional integrity thereof, said foamlike material comprising an open pore microporous nitrile acrylic copolymer foam having a Shore A hardness of between 20 and 60.

24. A ball bearing retainer comprising:

an annular body of flexible foamlike material for storing lubricant, and rigidizing means combined with said body for maintaining the dimensional integrity thereof, said foamlike material comprising an open pore microporous nitrile acrylic copolymer foam having Shore A hardness of between 20 and 60.

25. A ball bearing retainer comprising:

an annular body of flexible foamlike material for storing lubricant, and reinforcing members combined with said body for maintaining the dimensional integrity thereof, said foamlike material comprising an open pore microporous nitrile acrylic copolymer foam having a Shore A hardness of between 20 and 60.

26. A ball bearing retainer comprising:

an annular body of open pore microporous foamlike material for storing lubricant, and relatively rigid reinforcing members combined with said body for maintaining the dimensional integrity thereof, said foamlike material comprising an open pore microporous nitrile acrylic copolymer foam having a Shore A hardness of between 20 and 60.

* * * * *